Oar Lock.

No. 2,091. Reissued Oct. 17, 1865.

Witnesses,
H. C. Trewrn
Thos. Tusch

Inventors,
J. C. Flagg & F. W. Flagg
per
Munn & Co.
Attys.

UNITED STATES PATENT OFFICE.

IRA C. FLAGG AND F. W. FLAGG, OF MIDDLETOWN, CONNECTICUT.

IMPROVED ROWLOCK.

Specification forming part of Letters Patent No. 49,395, dated August 15, 1865; Reissue No. 2,091, dated October 17, 1865.

*To all whom it may concern:*

Be it known that we, IRA C. FLAGG and F. W. FLAGG, of Middletown, in the county of Middlesex and State of Connecticut, have invented a new and useful Improvement in Rowlocks; and we do hereby declare the following, when taken in connection with the accompanying drawings and the letters of reference marked thereon, to be a full, clear, and exact description of the same, and which said drawings constitute part of this specification, and represent, in—

Figure 1:
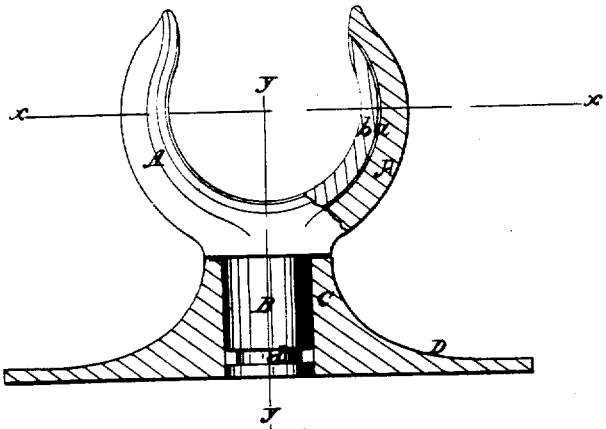
Figure 2:
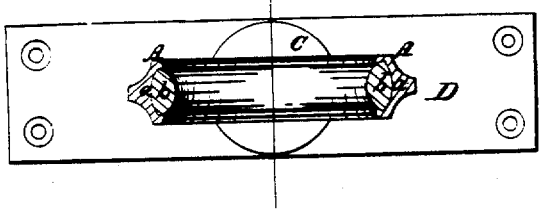

Figure 1, a sectional front elevation; Fig. 2, a horizontal section, the line *x x*, Fig. 1, indicating the plane of section; and in Fig. 3 a transverse vertical central section through *y y*, Fig. 1.

Similar letters of reference indicate like parts.

Our invention, designed to produce a rowlock in which the oar may work without noise or wear either upon the oar or rowlock, consists in forming the horns of metal, their inside surface recessed so as to receive and secure a pad of leather or other semi-flexible material, and the lock constructed with a shank to set into a socket on the top of the gunwale, so as to be readily secured therein or removed therefrom.

To enable others skilled in the art to construct and use our improvement, we will proceed to fully describe the same as illustrated in the accompanying drawings.

Figure 3:
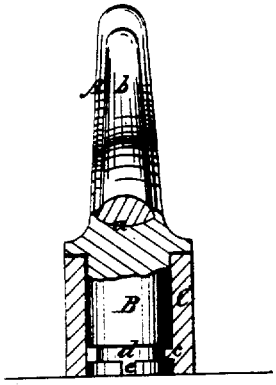

A A represent the two horns of the lock, formed from metal, with a shank, B. We prefer the form shown in Fig. 1, yet the shape of the horns is no part of our invention. The inside of the horns we form with a dovetail groove, *a*, as seen in Figs. 2 and 3. Into this dovetail groove we force the pad *b*, which said pad we make of leather or other semi-flexible material, so as to project from the horns, as seen in Figs. 2 and 3. The dovetail groove holds the pad, so that no additional security is required. This pad extends nearly over the whole inner face of the lock, so that the oar placed therein will not come in contact with the metal.

C is a socket formed upon a plate, D, by which it is secured to the gunwale, the socket C extending far enough above the plate to receive the shank B, so that the gunwale is not weakened by the attachment of the lock thereto. Around the shank B we form a groove, *d*. A slot, *e*, (see Fig. 3,) opens from the bottom of the shank into the groove *d*. A pin, *c*, projects from the inner surface of the socket, corresponding in position to the groove *d* on the shank B, so that when the shank is inserted within the socket the slot *e* will pass down over the pin *c* and enter the groove *d*, when, by turning the shank partially around, the horns will be secured in their position for use. A flange around the base of the horns covers the socket to protect the joint. The slot *e* and pin *c* should be in such relative position to each other that when the horns are in the position denoted in Fig. 2 the one should be nearly opposite the other.

By this construction the horns will freely turn to any position from forward aft, as may be required for the use of the oar, and the pad causes the oar to work noiselessly in the lock, and by the construction of the shank the lock may be readily removed, as occasion may require. Leather mats have often and long been used to prevent noise in the working of the oar. We do not therefore broadly claim the application of a flexible pad to rowlocks, our invention being the manner in which the pad is secured to the lock.

Having thus fully described our invention, what we claim, and desire to secure by Letters Patent, is—

Constructing the horns of rowlocks with a dovetail groove, *a*, to receive and hold the pad *b*, substantially as herein set forth.

IRA C. FLAGG.
F. W. FLAGG.

Witnesses:
JOHN E. EARL,
H. D. HATCH.